US011498881B2

(12) United States Patent
Bouton

(10) Patent No.: US 11,498,881 B2
(45) Date of Patent: Nov. 15, 2022

(54) COATING TAPE

(71) Applicant: Corning Incorporated, Corning, NY (US)

(72) Inventor: William Joseph Bouton, Big Flats, NY (US)

(73) Assignee: CORNING INCORPORATED, Corning, NY (US)

(*) Notice: Subject to any disclaimer, the term of this patent is extended or adjusted under 35 U.S.C. 154(b) by 636 days.

(21) Appl. No.: 16/375,160

(22) Filed: Apr. 4, 2019

(65) Prior Publication Data

US 2019/0225553 A1 Jul. 25, 2019

Related U.S. Application Data

(63) Continuation of application No. PCT/US2018/027059, filed on Apr. 11, 2018.

(Continued)

(51) Int. Cl.
*C04B 41/45* (2006.01)
*B05D 1/02* (2006.01)
(Continued)

(52) U.S. Cl.
CPC ............ *C04B 41/4523* (2013.01); *B05D 1/02* (2013.01); *B05D 3/12* (2013.01); *B05D 7/04* (2013.01);
(Continued)

(58) Field of Classification Search
CPC .............................. C23C 4/185; C23C 4/10–11
See application file for complete search history.

(56) References Cited

U.S. PATENT DOCUMENTS 2,639,490 A * 5/1953 Brennan ............ B22D 11/0697
29/17.2
5,387,444 A * 2/1995 Bachmann .......... B05B 17/0623
118/313

(Continued)

FOREIGN PATENT DOCUMENTS

CN 1130608 A 9/1996
CN 1629992 A 6/2005
(Continued)

OTHER PUBLICATIONS

Devasenapathi et al; "Forming Near Net Shape Free-Standing Componenets by Plasma Spraying"; Maerials Letters, 57 (2002) pp. 882-886.

(Continued)

*Primary Examiner* — Alex A Rolland
(74) *Attorney, Agent, or Firm* — Daniel J. Greenhalgh

(57) ABSTRACT

A process for manufacturing continuous ceramic tape includes steps of heating a ceramic feedstock to a molten state and spraying molten droplets of the feedstock onto a deposition surface. The method further includes forming a ceramic coating on the deposition surface by accumulating the droplets, which solidify and are directly bonded to one another. The deposition surface is non-stick with respect to the ceramic coating such that the coating may be peeled off of the deposition surface as a continuous ceramic tape, without fracture. Additionally, in embodiments, the deposition surface is removed by running the deposition over a bending edge, chemically stripping or dissolving the deposition surface, or burning the deposition surface.

14 Claims, 6 Drawing Sheets

Related U.S. Application Data

(60) Provisional application No. 62/485,067, filed on Apr. 13, 2017.

(51) Int. Cl.

| | | |
|---|---|---|
| *B05D 7/04* | (2006.01) | |
| *B32B 7/06* | (2019.01) | |
| *B33Y 10/00* | (2015.01) | |
| *B05D 3/12* | (2006.01) | |
| *B32B 18/00* | (2006.01) | |
| *C04B 35/622* | (2006.01) | |
| *B05D 3/02* | (2006.01) | |
| *B05B 9/00* | (2006.01) | |
| *B05B 13/02* | (2006.01) | |
| *B05D 1/28* | (2006.01) | |

(52) U.S. Cl.
CPC ............... *B32B 7/06* (2013.01); *B32B 18/00* (2013.01); *B33Y 10/00* (2014.12); *C04B 35/62218* (2013.01); *C04B 35/62222* (2013.01); *B05B 9/002* (2013.01); *B05B 13/0221* (2013.01); *B05D 1/286* (2013.01); *B05D 3/0272* (2013.01); *B05D 2201/02* (2013.01); *B05D 2202/00* (2013.01); *B05D 2203/22* (2013.01); *B05D 2252/02* (2013.01)

(56) References Cited

U.S. PATENT DOCUMENTS

| | | |
|---|---|---|
| 10,155,667 B2 | 12/2018 | Badding et al. |
| 2001/0003010 A1 | 6/2001 | Pham et al. |
| 2004/0126566 A1 | 7/2004 | Axen et al. |
| 2005/0128680 A1 | 6/2005 | Shin et al. |
| 2005/0269012 A1 | 12/2005 | Saito |
| 2009/0324916 A1* | 12/2009 | Hamaya ............... C23C 4/06 428/220 |
| 2015/0086743 A1 | 3/2015 | Lee et al. |
| 2018/0104848 A1 | 4/2018 | Badding et al. |

FOREIGN PATENT DOCUMENTS

| | | |
|---|---|---|
| CN | 103896595 A | 7/2014 |
| CN | 104350117 A | 2/2015 |
| CN | 106065457 A | 11/2016 |
| JP | 09-328367 A | 12/1997 |
| KR | 2005034814 A | 4/2005 |
| TW | 432453 B | 5/2001 |

OTHER PUBLICATIONS

International Search Report and Written Opinion of the International Searching Authority; PCT/US2018/027059; dated Jul. 26, 2018; 23 Pages; Korean Intellectual Property Office.

Neufuss et al; "Properties of Plasma-Sprayed Freestanding Ceramic Parts"; Journal of Thermal Spray Technology; vol. 6 (4) (1997); pp. 434-438.

Tok et al; "Tape Casting of High Dielectric Ceramic Substrates for Microelectronics Packaging"; Journal of Materials Enineering and Performance; vol. 8 (4); (1999); pp. 469-472.

Chinese Patent Application No. 201880024916.7, Office Action dated Sep. 3, 2021, 15 pages (6 pages of English Translation and 9 pages of Original Document), Chinese Patent Office.

Jian Wang, "Chemical Dictionary", Edition II, Chemical Industry Press, 1985, 4 pages (1 page of English Translation and 3 pages of Original Document).

\* cited by examiner

COATING TAPE

CROSS-REFERENCE TO RELATED APPLICATIONS

This application is a continuation of International Application No. PCT/US18/027059 filed on Apr. 11, 2018, which claims the benefit of priority of U.S. Provisional Application Serial No. 62/485,067 filed on Apr. 13, 2017 both applications being incorporated herein by reference.

BACKGROUND

Coatings are typically applied to articles with intent that the coatings bond and become integrated with the articles to provide additional attributes to the articles, such as surface hardness, increased surface gloss, hermetic sealing, aesthetic features, etc. Techniques have been developed to improve bonding and adhesion of the coatings to underlying materials.

SUMMARY

Applicants have discovered a manufacturing process that utilizes poorly bonded coatings by purposely delaminating the coatings from a deposition surface to form tapes.

Aspects of the present disclosure relate generally to a process for manufacturing a tape that includes steps of heating a feedstock material to a molten state and spraying molten particles or droplets of the feedstock material onto a deposition surface. The method further includes forming a coating on the deposition surface by accumulating the particles or droplets. In some such embodiments, particles or droplets are directly bonded to one another but the coating includes at least some voids between and/or around at least some of the particles or droplets. In some such embodiments, the deposition surface is non-stick with respect to the coating such that the coating may be peeled off the deposition surface (i.e. layer removed) as a continuous tape, such as of a length of at least 10 mm, without fracture.

According to an exemplary embodiment, the feedstock includes an inorganic material, such as a ceramic in a powder form or suspension. In some embodiments, the heating step heats the feedstock to a temperature above 250° C., while the deposition surface includes a thermoplastic polymer, which may have a melting temperature below the temperature of the heated feedstock. In some such embodiments, the deposition surface includes a fluoropolymer. In some embodiments, the coating is performed at a rate greater than 10 m/min of the length of the tape. According to an exemplary embodiment, after peeled off from the deposition surface, the coating has lower thermal conductivity and/or lower electrical conductivity than the feedstock material in bulk (i.e. fully densified), possibly due to higher porosity and voids, such as by at least 2%, such as at least 5% less thermal conductivity and/or increased dielectric strength.

In some embodiments, the spraying step is such that the molten particles or droplets splatter or flatten upon impact when forming the coating to have a thickness less than twice a lateral dimension thereof, thereby forming lamellae. In some such embodiments, the coating is between 20 μm to 250 μm thick on the deposition surface, and the thickness includes a stacking of overlapping lamellae. In some embodiments, the coating is formed into an elongate tape having a length greater than 10 m, and the process further may include winding the tape on a reel. In some embodiments, the process further includes a step of bonding particles or droplets from different sources of the spraying to provide a wide coating, such as where that coating has a width of at least 25 mm orthogonal to both the length and the thickness.

Other aspects of the present disclosure relate generally to a process for manufacturing that includes steps of heating a feedstock material, where the feedstock material specifically includes a ceramic, such as alumina or zirconia, and spraying heated particles or droplets of the feedstock material onto a deposition surface. The deposition surface specifically includes a fluoropolymer, such as polytetrafluoroethylene. The process further includes a step of forming a coating on the deposition surface by accumulating the particles or droplets, where the particles or droplets are directly bonded to one another but the coating includes at least some voids between and/or around at least some of the particles or droplets. According to an exemplary embodiment, the spraying is such that the heated particles or droplets splatter or flatten, thereby forming lamellae. The process further may include a step of removing the coating from the deposition surface to form a continuous tape. In some such embodiments, the continuous tape has a length of at least 10 mm and a thickness between 20 μm to 250 μm. According to some such embodiments, the thickness includes a stacking of overlapping lamellae formed from the droplets, where lateral dimensions of the overlapping lamellae are generally orthogonal to the thickness of the tape.

According to an exemplary embodiment, the tape is more specifically an elongate tape having a length greater than 10 m, the process may further include winding the tape on a reel. In some embodiments, the coating step is performed at a rate greater than 10 m/min of the length of the coating. In some embodiments, the process includes bonding heated particles or droplets from different sources of the spraying to provide a wide coating, such as at least 25 mm.

Still other aspects of the present disclosure relate generally to a sheet, and/or more specifically to a tape. The sheet includes a microstructure of overlapping lamellae. In some such embodiments, the lamellae are directly bonded to one another but include at least some voids between and/or around at least some of the lamellae. In such some embodiments, the sheet is free standing and/or is separable from a deposition surface such that the sheet may be peeled off the deposition surface as a continuous sheet of a length of at least 10 mm, without fracture. According to exemplary such embodiments, the sheet has a thickness orthogonal to the length of at least 20 μm up to 3 mm, up to 5 mm, or more depending upon whether the sheet includes multiple layers (see generally sheet 520 of FIG. 5 for example).

In some embodiments, the sheet is thin such that the thickness is no more than 250 μm. In some embodiments, the sheet is more specifically an elongate tape having a length of at least 10 m. The elongate tape may be wound on a reel. In some embodiments, the lamellae are ceramic, such as alumina. The sheet and/or tape may have lower thermal conductivity and/or lower electrical conductivity than the inorganic material in bulk.

The sheet and/or tape may be formed from adjoining layers with interfaces therebetween. The layers may be dissimilar materials. The sheet and/or tape may be free standing, may be bonded to a deposition surface in the form of a carrier, such as polymeric carrier.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
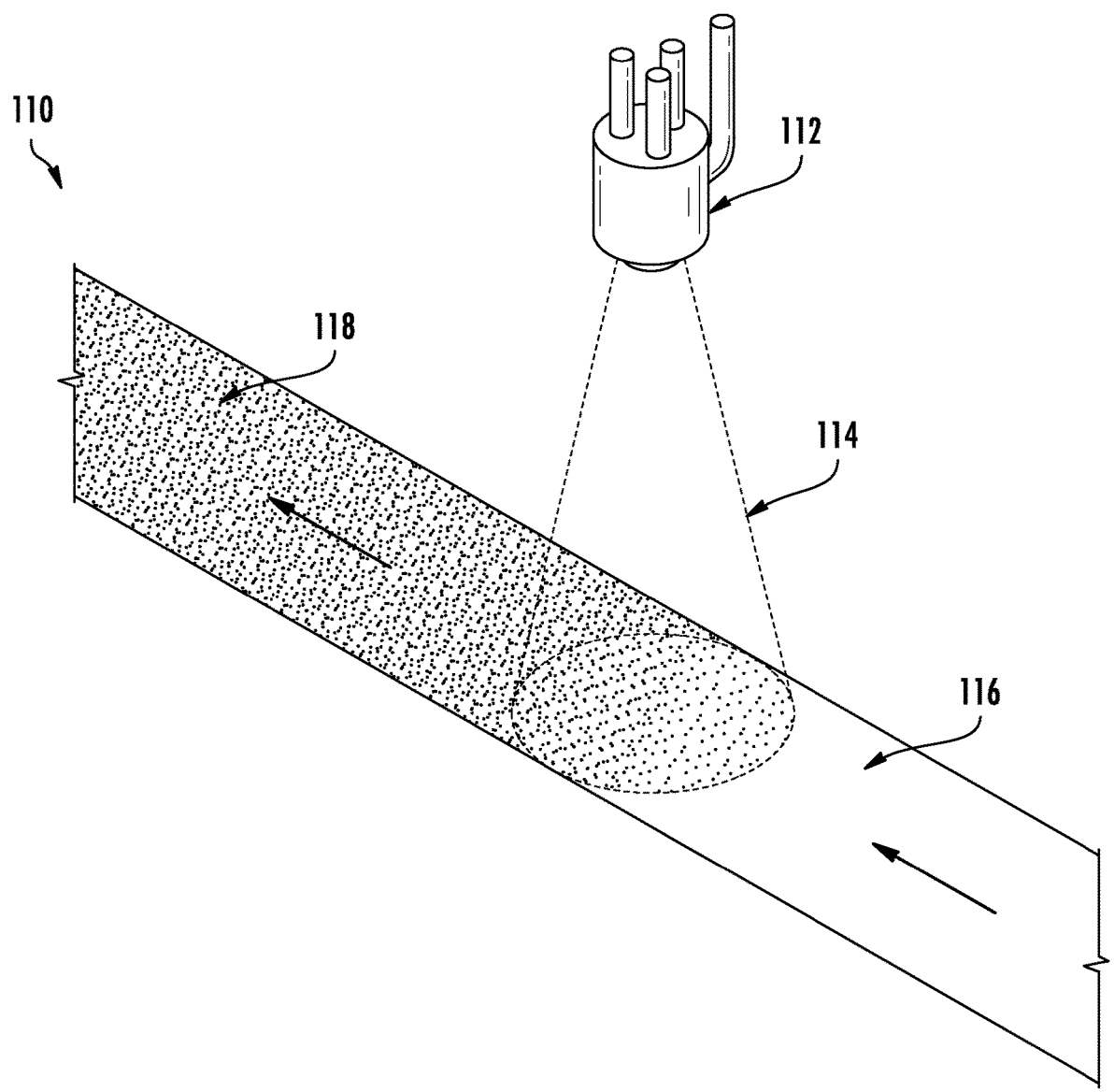
FIG. 1 is perspective view of a manufacturing line according to an exemplary embodiment.

Referring to FIG. 1, a manufacturing line 110 includes a spray head 112 that directs particles or droplets 114 (shown as a cone of spray) of feedstock material onto a deposition surface 116, such as via thermal spray (e.g., plasma spray) equipment and techniques. More specifically, according to an exemplary embodiment, the feedstock material is heated and the particles or droplets 114 may be in a molten state prior to and/or during the spraying. The process forms a coating 118 (e.g., layer, film) on the deposition surface 116 by accumulating the particles or droplets 114.

In some such embodiments, the deposition surface 116 is non-stick with respect to the coating 118 such that the coating 118 may be peeled off the deposition surface 116 as a sheet and/or a continuous tape, such as a sheet 120 of a length L of at least 10 mm, without fracture (i.e. crack and tear apart widthwise across the sheet 120 or tape) such as at least 10 cm, such as at least 1 m, such as at least 10 m. In some embodiments, the deposition surface 116 specifically includes a polymer, such as a thermoplastic polymer, such as fluoropolymer, such as polytetrafluoroethylene. Polymer may be counterintuitive as a deposition surface material due to high temperatures of the droplets from the heating step. In other embodiments, different materials may be used with the deposition surface 116 to facilitate delamination of the coating 118, such as polysiloxanes or other polymers, or other materials such as anodized aluminum, for example. In contemplated embodiments, the deposition surface 116 may be flexible, such as a thin layer (e.g., less than 1 mm thick, such as less than 0.5 mm) of polymeric material as disclosed above, such as a polymeric carrier having a surface with a non-stick fluoropolymer. Flexibility of the deposition surface 116 may help removal thereof, such as by peeling.

In some embodiments, the heating step heats the feedstock to a temperature above 250° C., while the deposition surface 116 includes a thermoplastic polymer, which may have a melting temperature actually below that of the heated feedstock. The combination of a high temperature spray of particles or droplets 114 (e.g., at least 300° C., such as at least 450° C., such as at least 600° C.) and a lower-melting temperature deposition substrate 116 (e.g., that being less than 600° C., such as less than 450° C., such as less than 300° C.) may be counterintuitive. However, small particles or droplets 114 may have insufficient thermal mass and/or temperature to melt or melt much the deposition surface 116.

According to an exemplary embodiment, the feedstock and corresponding particles or droplets 114, is or includes an inorganic material, such as a ceramic in a powder form or suspension. For example, the feedstock may be, include, and/or mostly include (by weight percentage) alumina or zirconia, such as yttria-stabilized zirconia, precursors thereof, and/or other ceramics. Such materials may be cumbersome to manufacture as thin sheets via conventional processes, such as slicing of boules or via tape casting. In other contemplated embodiments, feedstock may be or include other materials, such as glass, metals, ceramic, and/or polymer.

Applicants believe manufacturing processes disclosed herein to be particularly efficient for forming sheets 120 of material, such as thin ceramic tapes. In some contemplated embodiments, the step of forming the coating 118 is performed at a rate greater than 5 m/min of the length of the coating 118, such as a rate greater than 10 m/min of the length of the coating 118, such as a rate greater than 12 m/min of the length of the coating 118. For example, Applicants estimate that a tape 42 mm wide could be produced at 12-13 m/min with technology disclosed herein.

Figure 3:
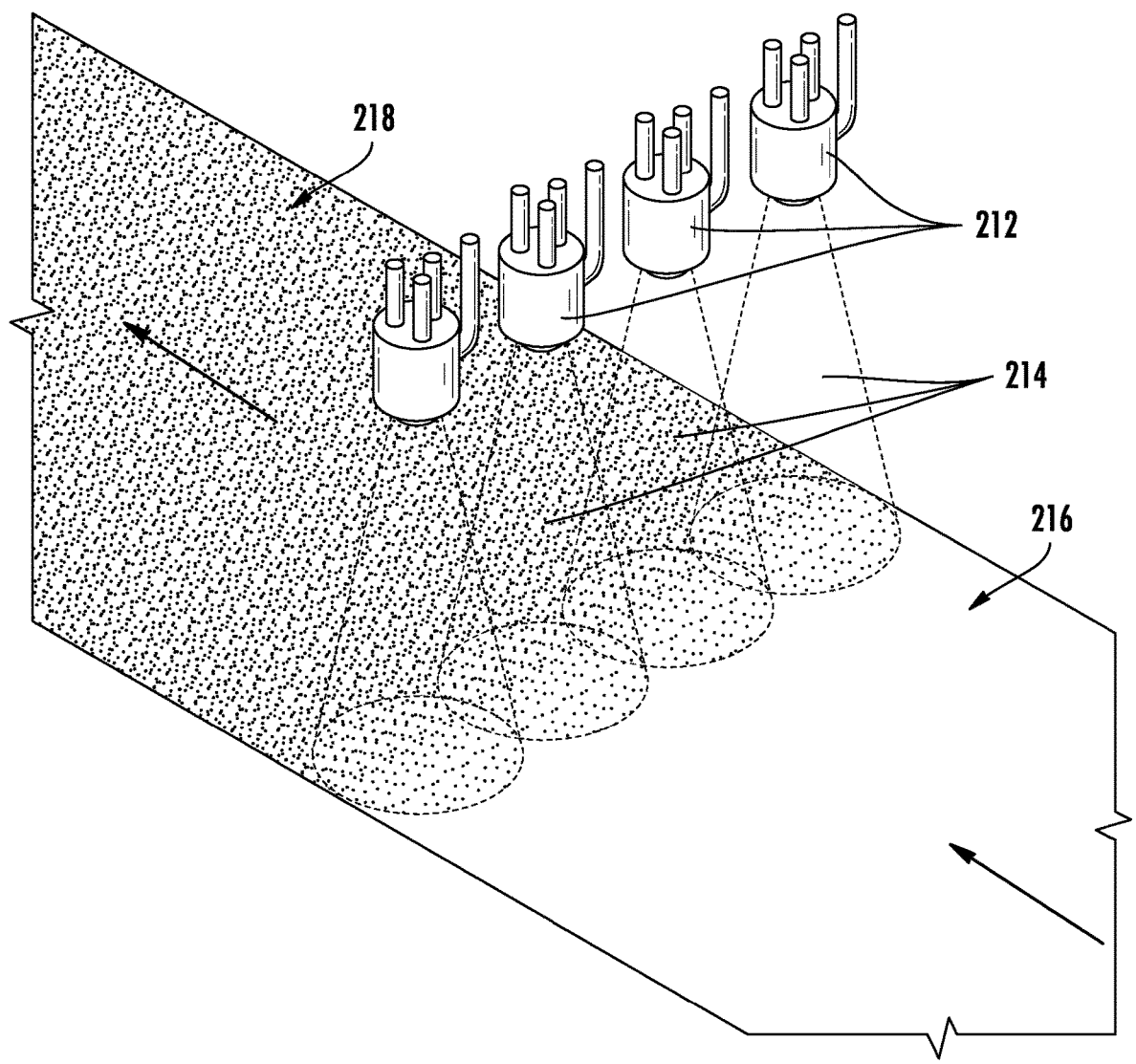
FIG. 3 is perspective view of a manufacturing line according to another exemplary embodiment.
Figure 5:
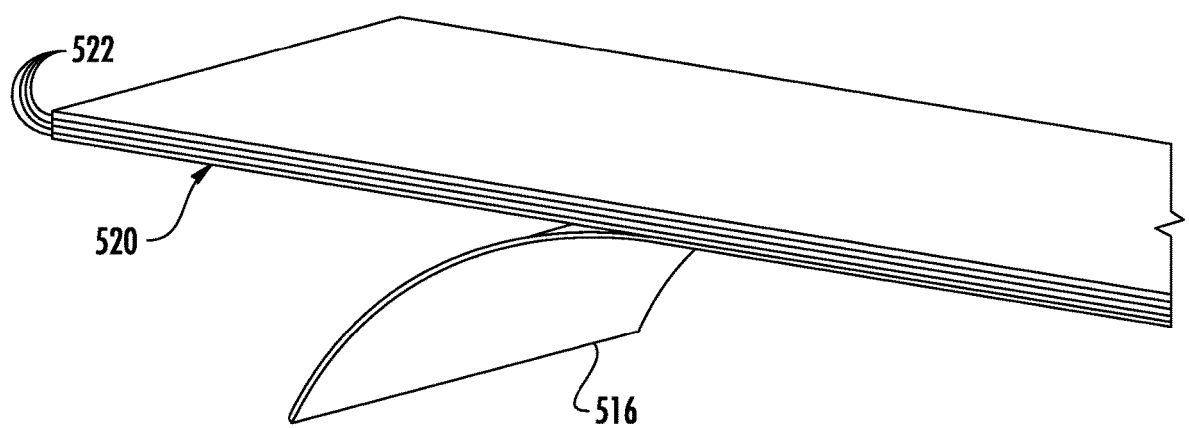
FIG. 5 is perspective view of a sheet according to another exemplary embodiment.

According to some exemplary embodiments, the particles or droplets 114 are a different material (i.e., composition) than the deposition surface 116. But in some contemplated embodiments, multiple passes through the manufacturing line 110 or passage past multiple spray heads 120 in series may add and/or at least party overlap layers of the coating material over one another, such as to increase thickness of the coating 118 and corresponding sheet 120. For example, in some such embodiments, the multiple passes or spray heads may be arranged side-by-side so as to increase the width of the sheet 120, as shown in FIG. 3. In other contemplated embodiments, the multiple passes or spray heads may be in series, such that the layers overlap and stack upon one another, such as to provide a multi-layered sheet (see generally sheet 520, as shown in FIG. 5).

Figure 2:
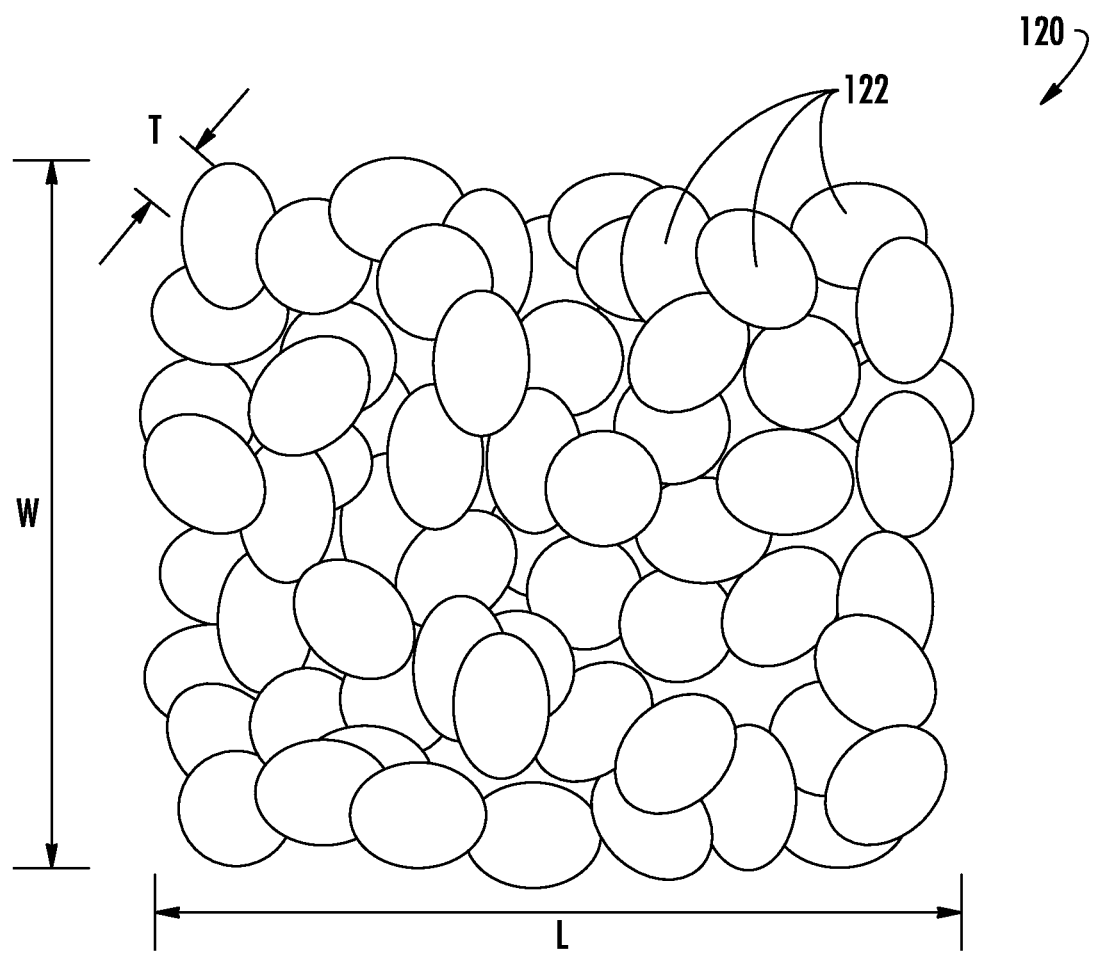
FIG. 2 is a conceptual diagram from a top perspective view of a sheet or portion of a tape according to an exemplary embodiment.

Referring to FIG. 2, according to an exemplary embodiment the spraying step is such that the heated and/or molten particles or droplets 114 splatter or flatten when forming the coating 118, thereby forming lamellae 122 (i.e., scale- or plate-like structures). According to an exemplary embodiment, the lamellae 122 have a thickness less than half a lateral dimension (e.g., length, width) thereof, such as less than a quarter, such as less than a tenth. According to an exemplary embodiment, the thickness of the coating 118 or sheet 120 includes a stacking of overlapping lamellae 122. In some such embodiments, the coating 118 is between 20 μm to 250 μm thick on the deposition surface 116 and/or the sheet 120 has a thickness T between 20 μm to 250 μm. Lamellae microstructure may increase flexibility of the respective sheet 120, relative to isotropic structures, and/or may impede crack propagation. Lamellae may be observed via standard microscopy techniques, such as when viewing unpolished surfaces or cross-sections of the sheet 120. However, shape of the lamellae may be less uniform than is shown in FIG. 2. In contemplated embodiments, the sheet 120 may be processed and/or formed to remove or without lamellae or without distinct lamellae, such as via post-deposition heating in furnace 314 (FIG. 4).

In some embodiments, the coating 118 is applied along a swath of the deposition surface, and the coating 118 forms a sheet 120 that is more specifically an elongate tape, having a length L greater than 10 m. In some embodiments, the elongate tape is much longer than wide, such as having a length L to width W aspect ratio of at least 5:1, such as at least 10:1, such as at least 100:1. The manufacturing process may further include winding the elongate tape on a reel (see, e.g., FIG. 4, reel 312).

Referring to FIG. 3, in some embodiments, the process further includes a step of bonding particles or droplets from different spray heads 212 to provide a wide coating. As shown in FIG. 3, the spray heads 212 provide multiple spray cones of droplets or particles 214 that may overlap one another when depositing the droplets or particles 214 on a deposition surface 216, such as where that overall coating 218 has a width W (see FIG. 2), orthogonal to both the length L and the thickness T, of at least 10 mm, such as at least 25 mm, such as at least 50 mm.

Figure 4:
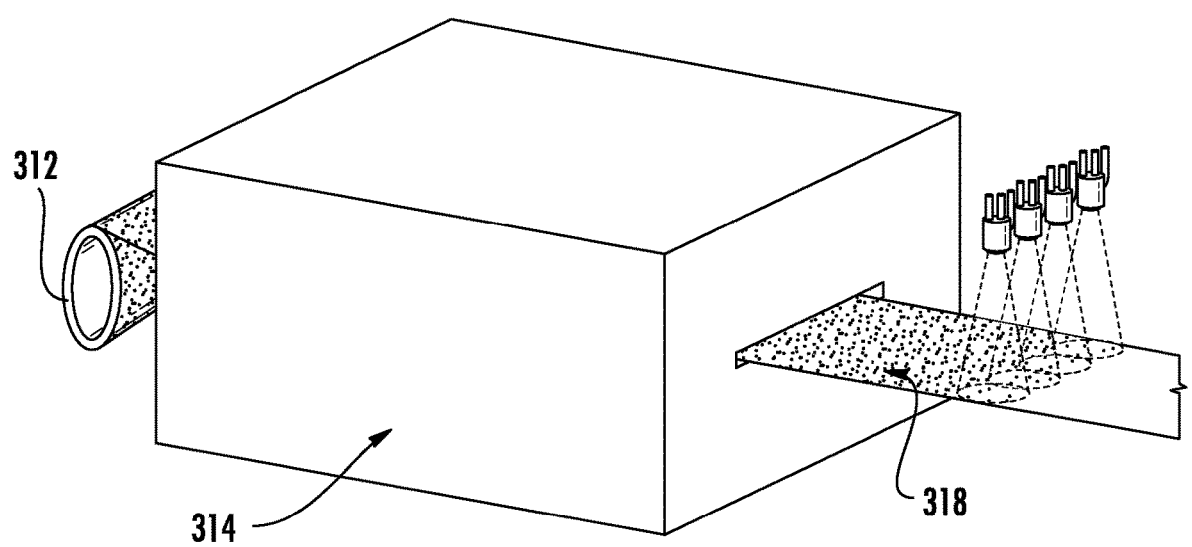
FIG. 4 is perspective view of a manufacturing line according to yet another exemplary embodiment.

Referring to FIG. 4, a material 318, such as the coating 218 with the deposition surface 216 or alternatively only the sheet 120, may be directed into a furnace 314 for additional processing. For example, the furnace may heat the material 318 such as to increase bonding between the particles 122, to flatten the material 318, to anneal the material 318, or for other reasons. However, Applicants believe that a large advantage of technology disclosed herein is that the furnace 314 and additional heating may be unnecessary to achieve the sheet 120—the initial heating, accumulating, and bonding steps may be sufficient.

With or without the furnace, the sheet 120 and/or the coating 218 on the deposition surface 216 (e.g. carrier), may be wound on a reel, such as a reel 312 having a diameter of less than 3 m, such as less than 1 m. The ability to wind the sheet 120 on the reel 312 is a function of the composition and/or the thickness of the material. For example, Applicants believe that alumina tape having a thickness of less than 200 μm and microstructure (i.e., small scale structure of the material, as revealed by microscopy) as described herein, may be wound on such reels 312 without fracture.

Referring to FIG. 5, multiple passes along a manufacturing line 110 or passage along a series of such lines may produce a sheet 520 or tape having multiple layers 522. In some embodiments, the sheet 520 (or sheet 120) may be thick, as disclosed above, such as if the sheet 520 contains multiple layers 522. In some such embodiments, the sheet 520 may be generally rigid compared to deposition substrates as disclosed herein, such as a polymeric carrier 516. In some embodiments, the sheet 520 or tape may be parsed or singulated, such as into discrete pieces, which may be stacked. The discrete pieces may be separated from respective deposition substrates and/or may be further processed in a furnace, such as furnace 314.

While a polymer deposition surface has primarily been discussed herein, other deposition surfaces are also suitable for use in embodiments of the present invention. For example, other suitable materials for use as deposition surfaces 116, 216, 516 include organic or inorganic materials, such as paper, wood, ceramics, glasses, or metals (e.g., stainless steel, copper, platinum, brass, etc.). Additionally, while "no-stick" or "non-stick" embodiments were previously discussed, "low-stick" materials could be used that have just enough adhesion for the droplets 114, 214 to stick to the deposition surface 116, 216, 516. Further, the deposition surface 116, 216, 516 could be roughened (e.g., through sand blasting) to improve adhesion during the initial stages of deposition, while still allowing for relatively easy peeling of the deposition surface 116, 216, 516 from the coating 118, 218 or sheet 520. Notwithstanding, in further embodiments, other techniques besides peeling can be used to remove the deposition surface 116, 216, 516. For example, paper and polymer deposition surfaces 116, 216, 516 can be burned off of the coating 118, 218 or sheet 520. Additionally, for any of the deposition surfaces 116, 216, 516, the coating 118, 218 or sheet 520 can be released from the deposition surface 116, 216, 516 by running the deposition surface 116, 216, 516 over a bend (an embodiment of which is discussed in more detail below). Still further, the deposition surface 116, 216, 516 can be dissolved or chemically stripped away from the coating 118, 218 or sheet 520.

Using any of the previously described embodiments, the coating 118, 218 or sheet 520 may be up to 300 μm thick in embodiments. In still other embodiments, the coating 118, 218 or sheet 520 may be up to 3 mm thick, and in yet further embodiments, the coating 118, 218 or sheet 520 may be up to 5 mm thick. In certain embodiments, e.g., in which the coating 118, 218 or sheet 520 is greater than 100 μm thick, then the coating 118, 218 or sheet 520 may be singulated instead of winding the over a reel. In embodiments, the singluated coating 118, 218 or sheet 520 is at least 50 mm in length.

In sheets 520 built up from multiple layers 522, each layer can be a different material and/or have a different density. For example, each layer 522 can be a different material, such as different ceramic materials (e.g., alumina or zirconia). Also, by way of example, each layer 522 can be a different density. In an embodiment, a first porous layer 522 is deposited followed by a denser layer 522, and in such embodiments, the first porous layer 522 has a density that is less than the density of the second layer 522. Such layer structures may be useful in certain technologies, such as for batteries. Additionally, a first porous layer 522 may be deposited to enhance adhesion of the second, denser layer 522. Thereafter, additional dense layers 522 can be further applied, and optionally, the first porous layer 522 can be dissolved.

As mentioned above, the coatings 118, 218 or sheet 520 may undergo further processing in a furnace, such as furnace 314. In furnace 314, the coatings 118, 218 or sheet 520 may be sintered. In embodiments, one effect of sintering is to increase the density of coatings 118, 218 or sheet 520. Sintering can take place for either the continuous tape or singulated segments.

Figure 6:
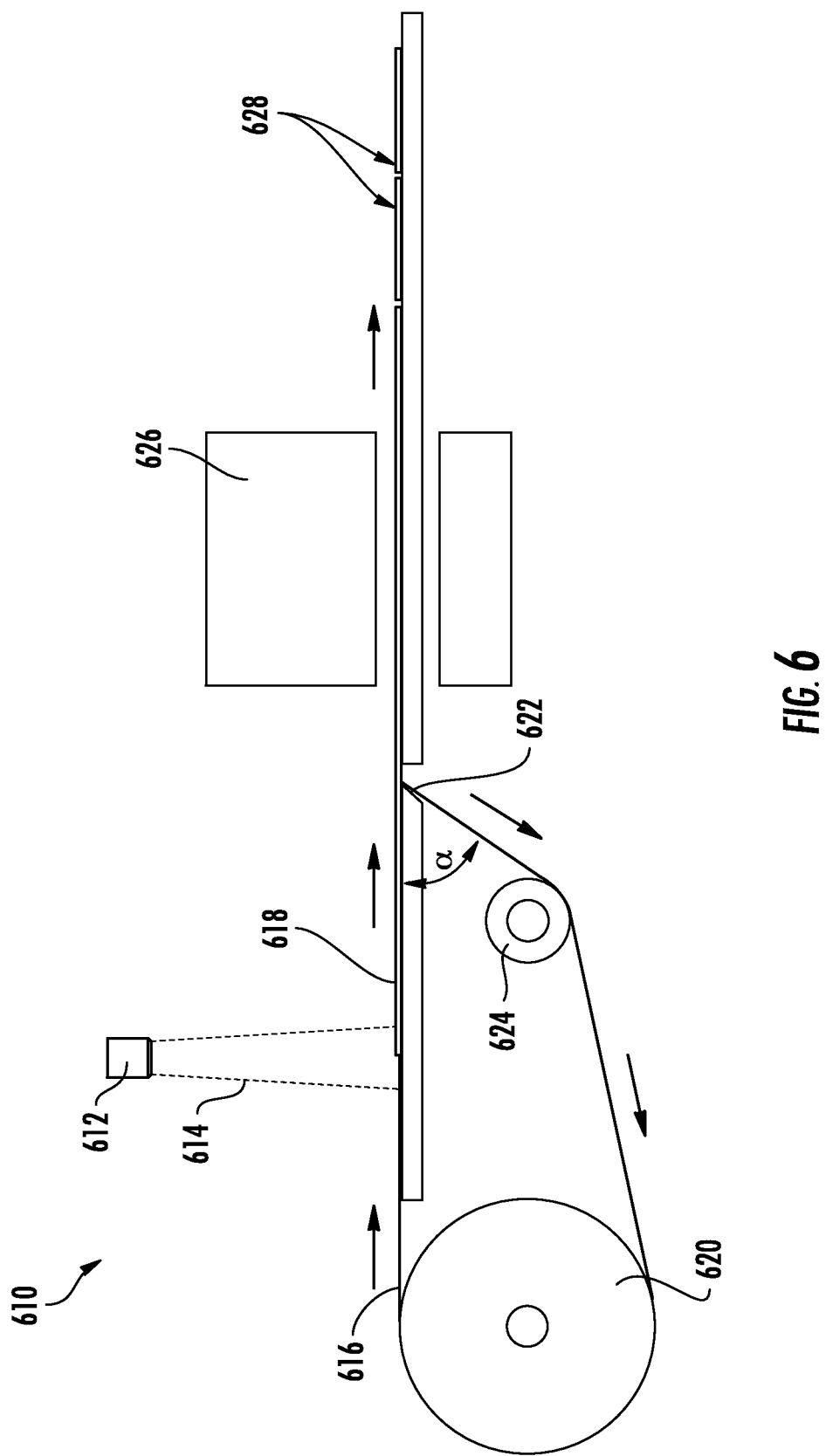
FIG. 6 is schematic side view of a manufacturing line according to another exemplary embodiment.

With reference now to FIG. 6, another embodiment of a manufacturing line 610 is provided. As in the previous embodiments, the manufacturing line includes a spray head 612 that directs particles or droplets 614 (shown as a cone of spray) of feedstock material onto a deposition surface 616 so as to build up a coating 618. However, in the embodiment depicted in FIG. 6, the deposition surface 616 is a continuous belt driven by a drive pulley 620. That is, the droplets 614 are sprayed onto the deposition surface 616 to form the coating 618, and the deposition surface is then peeled from the coating 618 at edge 622. In particular, the sharp change in direction for the deposition surface 616 at edge 622 is enough to cause separation of the deposition surface 616 from the coating 618. A bend pulley 624 sets the angle at which the deposition surface 616 is separated from the coating 618. In embodiments, the angle α that the deposition surface 616 forms is from about 0° (e.g., bending the deposition surface 616 over and back under a thin plate) to less than 180° (e.g., depending on how far to the right past the edge 622 that the bend pulley 624 is placed with respect to the orientation of FIG. 6). In other embodiments, the angle α is from 45° to 135°, and in still other embodiments, the angle α is from 60° to 90°. As can be seen in FIG. 6, the deposition surface 616 is recirculated by the drive pulley 620 for the continuous deposition of droplets 614 to continuously form the coating 618.

As in the embodiments described above, the deposition surface 616 can be a polymer, such as a thermoplastic polymer, including fluoropolymers (e.g., polytetrafluoroethylene). Additionally, in embodiments, the deposition surface 616 can be paper or a metal strip or foil, such as stainless steel or copper. In embodiments, each of these materials for the deposition surface 616 can be surface roughened to improve adhesion of the droplets 614 on the deposition surface 616.

Further, as in the embodiments described above, the feedstock is formed into droplets 614 via the spray head 612 at a high temperature (e.g., feedstock can reach temperatures as high as 10,000 K), but the feedstock is "cooled" by the time it reaches the deposition surface 616. As described above, coating may take place at a rate of 10 m/min. However, in some embodiments, the coating may take place at a lower rate, e.g., 7 m/min, 5 m/min, or 3 m/min. As discussed above, coating of the deposition surface 616 can be accomplished by multiple spray heads 614 arranged in parallel to cover a wider swath and/or in series to deposit more layers or materials.

As discussed above, the deposition surface 616 is separated from the coating 618 at the edge 622. In embodiments, the coating has a thickness of at least 20 μm. In other embodiments, the coating has a thickness of at least 100 μm, and in still other embodiments, the coating has a thickness of at least 200 μm. In embodiments, the thickness is at most 5 mm. In other embodiments, the coating is at most 3 mm, and in still other embodiments, the coating is at most 300 μm. The coating 618 may undergo further processing, such as sintering in furnace 626 to, e.g., increase the density of the coating 618. Additionally, the continuous tape of coating 618 may undergo singulation before, after, or without sintering to forming singulated strips 628. Such singulated strips 628 may have a length of up to about 10 mm, up to about 25 mm, up to about 50 mm, or up to about 100 mm.

In another embodiment similar to that shown in FIG. 6, the deposition surface 616 is not a continuous belt, and the drive pulley 620 can be replaced with a feed roll. In this way, a continuous strip of the material for the deposition surface 616 is fed into manufacturing line 610 for deposition of the coating 618. In embodiments, the deposition surface 616 can remain with the coating 618 during subsequent processing, e.g., sintering in the furnace 626 and/or during singulation. In other embodiments, upon reaching the edge 622, the coating 618 can be separated from the deposition surface 616 by releasing via bending or removing via burning or chemical stripping/dissolving. When removed via bending, the bend pulley 624 can be replaced with a take-up roll to take-up the strip of deposition surface 616 as it is separated from the coating 618. When removing via burning or chemical stripping/dissolving, an apparatus can be placed after the edge 622 to apply the requisite flame or chemicals to cause removal of the deposition surface 616. Thereafter, the separated coating 618 can continue on for further processing, such as sintering in the furnace 626 and/or singulating into strips 628.

The construction and arrangements of the methods and products, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A process for manufacturing a tape, comprising:
heating a feedstock of an inorganic material to a molten state;
spraying molten droplets of the feedstock from a spray head onto a deposition surface, the deposition surface comprising a thermoplastic polymer;
moving the spray head and deposition surface relative to one another such that the spraying occurs along a swath of the deposition surface;
accumulating the droplets on the deposition surface, wherein the droplets solidify and directly bond to one another to form a coating along the swath; and
removing the coating from the deposition surface as a continuous tape,
wherein the deposition surface is non-stick with respect to the inorganic material such that the continuous tape peels off of the deposition surface during the removing step.

2. The process of claim 1, wherein the heating heats the feedstock to a temperature above 250° C.

3. The process of claim 1, wherein the deposition surface comprises a fluoropolymer.

4. The process of claim 1, wherein the feedstock comprises a ceramic in a powder form or suspension.

5. The process of claim 1, wherein the spraying is such that the molten droplets splatter or flatten, when forming the coating, to have a thickness less than twice a lateral dimension thereof, thereby forming lamellae.

6. The process of claim 5, wherein the coating is between 20 μm to 250 μm thick on the deposition surface, and wherein the thickness comprises a stacking of overlapping lamellae.

7. The process of claim 5, wherein, after the removing, the coating has lower thermal conductivity and/or lower electrical conductivity than the feedstock material in bulk.

8. The process of claim 1, wherein the continuous tape has a length greater than 10 m, the process further comprising winding the tape on a reel.

9. The process of claim 1, wherein the continuous tape is manufactured at a rate greater than 10 m/min of length.

10. The process of claim 1, comprising bonding particles or droplets from a plurality of spray heads to provide a wide coating, that coating having a width of at least 25 mm orthogonal to both length and thickness thereof.

11. A process for manufacturing a tape, comprising:

spraying molten droplets of the feedstock from a spray head onto a deposition surface, wherein the deposition surface comprises a polymer;

forming a ceramic coating on the deposition surface by accumulating the droplets, wherein the spraying is such that the molten droplets splatter or flatten, when forming the ceramic coating, to have a thickness less than twice a lateral dimension thereof, thereby forming lamellae, wherein the lamellae are directly bonded to one another and wherein the coating includes at least some voids between and/or around at least some of the lamellae, and removing the coating from the deposition surface to form a continuous tape, wherein the tape has a length of at least 10 mm, wherein the tape has a thickness of between 20 μm to 250 μm and wherein the thickness comprises microstructure of stacked overlapping lamellae with the lamellae oriented with lateral dimensions of the lamellae orthogonal to the thickness of the tape.

12. The process of claim 11, wherein the tape is more specifically an elongate tape having a length greater than 10 m, the process further comprising winding the tape on a reel.

13. The process of claim 11, wherein the forming is performed at a rate greater than 10 m/min of the length of the coating.

14. The process of claim 11, further comprising bonding lamellae from different spray heads, the coating having a width of at least 25 mm.

* * * * *